Aug. 12, 1958    E. HAGENLOCHER    2,846,857
TORSIONALLY RESILIENT FLEXIBLE COUPLINGS
Original Filed Feb. 11, 1952

INVENTOR
Ernest Hagenlocher

BY
ATTORNEYS

United States Patent Office 2,846,857
Patented Aug. 12, 1958

2,846,857

TORSIONALLY RESILIENT FLEXIBLE COUPLINGS

Ernest Hagenlocher, Warren, Pa.

Original application February 11, 1952, Serial No. 271,008, now Patent No. 2,745,267, dated May 15, 1956. Divided and this application March 19, 1956, Serial No. 572,578

7 Claims. (Cl. 64—13)

This invention relates to improvements in flexible couplings.

The present application is a division out of my parent application Serial No. 271,008, filed February 11, 1952, a part of which has issued as U. S. Patent 2,745,267, dated May 15, 1956.

The primary object of this invention is the provision of an improved flexible coupling of the general type set forth in U. S. Patent 2,182,711 but having torsional deflecting means of a general nature set forth in Patent 2,593,877, but showing a spool type coupling structure wherein the spool is disposed between end flexible disc sets, rubber sandwiches and coupling flanges.

A further object of this invention is the provision of an improved flexible coupling structure adaptable for taking care of conditions of shaft parallel and angular misalignment, end float, and for absorbing torsional shocks.

Other objects and advantages of this invention will be apparent during the course of the following detailed description.

In the accompanying drawing, forming a part of this specification and wherein similar reference characters designate corresponding parts throughout the several views.

Figure 1:
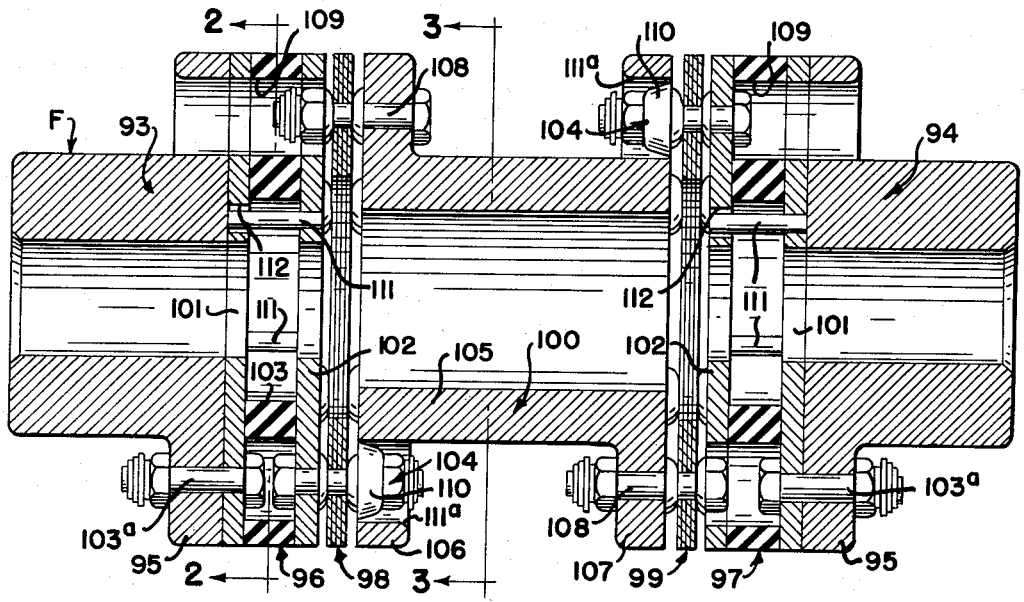
Figure 1 is a longitudinal cross sectional view taken through the improved spool type coupling structure which includes pairs of flexible metal disc sets, rubber sandwiches and shaft coupling flanges.
Figure 2:
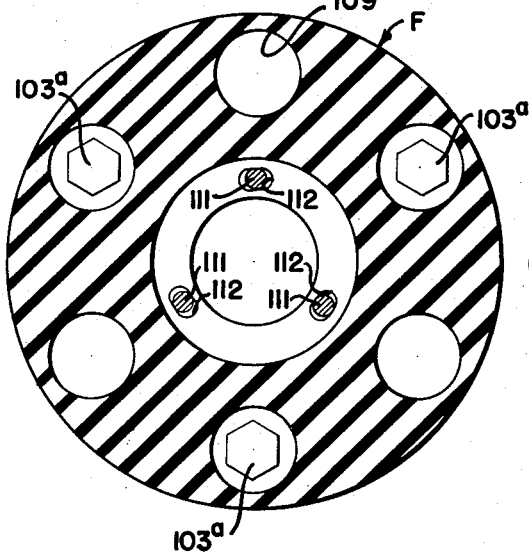
Figures 2 and 3 are transverse cross sectional view taken through the structure of the coupling of Figure 1 substantially on the respective lines shown in Figure 1.
Figure 3:
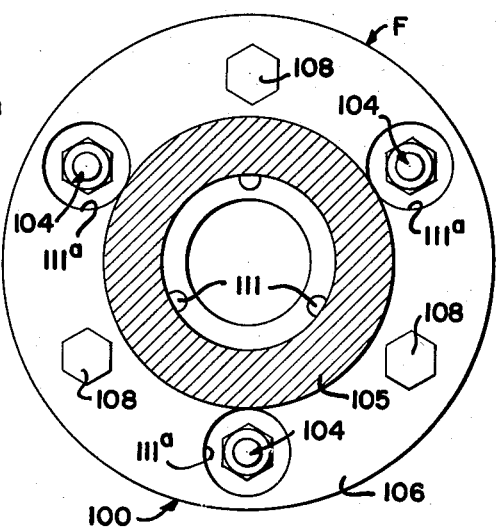

The coupling structure generally referred to as F in Figures 1, 2 and 3 is of a spool type wherein the spool is disposed between coupling flanges and having connected at each end thereof a transversely flexible disc set, a rubber torsion deflectable sandwich and coupling flanges for the drive and driven shafts.

In coupling F there is provided coupling members 93 and 94 having the flanges thereof directly connected to rubber sandwiches 96 and 97, respectively. Each of the rubber sandwiches 96 and 97 has connected therewith a transversely flexible disc set. The sets are indicated at 98 and 99 and connected to the rubber sandwich structures, with the flexible disc sets located innermost. They are also connected to the flanges of a spool 100.

The rubber sandwiches 96 and 97 each include a coupling member attaching plate 101 and a spaced metal plate 102; the same having bonded therebetween a rubber sandwich core 103 in a manner well understood in the art. The rubber sandwich plates 101 are connected by bolt structures 103ª to the flanges 95 of the coupling members 93 and 94 and the other flanges 102 are directly connected by means of the bolt sets 104 to the laminated steel disc sets 98 and 99. The spool 100 includes the cylindrical body portion 105 and the spaced flanges 106 and 107 at the ends thereof. Bolt structures 108 connect the flanges 106 and 107 to the steel disc sets 98 and 99 directly, and in circumferentially staggered relation with respect to the bolt assemblages 104. The rubber cores 103 are transversely apertured at 109 to receive the heads and nuts of the various bolt structures. At the locations of the safety type bolt structures 104 the coupling flanges may be provided with openings 111ª to receive the safety bushings 110 to prevent complete droppage of parts should the disc sets fracture.

Motion limiting means to limit the torsional stresses upon the rubber cores are provided for each of the rubber sandwich structures 96 and 97, consisting of pins 111 fixedly secured to the inner faces of one of the sandwich plates operating at their free ends in oblong openings 112 in the other plate.

It will be apparent from the foregoing that a coupling structure has been provided which can be used under conditions where parallel and angular shaft misalignment, shaft end float and torsional shocks must be taken care of. The parts may be readily dis-assembled without shaft or machinery movement.

Various changes in the size, shape and arrangement of parts may be made to the form of invention herein shown and described, without departing from the spirit of the invention or scope of the claims.

I claim:

1. A flexible coupling structure comprising coupling parts each including hubs and an attaching flange, a rubber sandwich for each of the coupling parts, each rubber sandwich including a resilient rubber load supporting inherently flexible member and rigid metal side plates bonded at each side thereto, bolts connecting the outermost of the plates of the rubber sandwiches to the respective attaching flanges of the coupling parts, a central spool having attaching flanges at the ends thereof, transversely flexible metal disc sets located between each attaching flange of the spool and the innermost adjacent plate of the adjacent rubber sandwich, bolt means connecting the respective disc sets to the adjacent attaching flange of the spool at spaced circumferential locations, bolts connecting each of the flexible disc sets at circumferentially spaced locations staggered with respect to those bolts which connect the respective disc sets to the attaching flanges of the spool, the last mentioned bolts being connected to the adjacent innermost plates of the adjacent rubber sandwiches.

2. A coupling structure as defined in claim 1 in which the plates of each individual rubber sandwiches are connected with means which limit the circumferential deflection of the rubber member.

3. A coupling structure as defined in claim 1 in which the bolts which connect the spool flange to the disc sets have ends projecting into openings in the adjacent sandwich plates to limit relative dropping of the parts in event of fracture of the disc sets.

4. A flexible coupling structure comprising a pair of coupling parts each of which includes a shaft connecting hub and a radially outwardly extending attaching flange, a rubber sandwich for each of the coupling parts, each rubber sandwich including a resilient rubber load supporting inherently flexible core and rigid metal side plates bonded at each side of the core, means connecting the outermost of said plates of the rubber sandwiches to the respective adjacent attaching flange of the adjacent coupling part, a central spool having a hub portion and radial attaching flanges at each end of the hub portion, a pair of laminated transversely flexible metal disc sets, each set comprising a plurality of metal discs in side abutting contact relation, a set being located between each attaching flange of the spool and the innermost adjacent plate of the adjacent rubber sandwich, means connecting the respective disc sets to the adjacent attaching flanges of the spool at spaced circumferential locations, and means connecting each of the flexible disc sets to the adjacent inner plate of the adjacent sandwich at circumferentially spaced locations which are staggered with respect to those points of connection of the respective disc sets to the respective attaching flanges of the spool.

5. In a torsionally resilient flexible coupling adapted to receive heavy radial loads the combination of a flywheel adapter coupling flange having a central opening therein, a driving shaft coupling flange having a sleeve type hub and an attaching flange, the hub remote from the shaft coupling flange extending into the central opening of the first mentioned coupling flange in loose radially spaced relation from the wall surfaces of said central opening, a set of laminated transversely flexible metal discs connected at circumferentially spaced locations to the flange of the drive shaft coupling, and a torsionally deflecting rubber sandwich type structure connected to the adapter flange between it and the flange of the drive coupling, means connecting the sandwich to the laminated disc set at locations upon said disc set which are staggered with respect to the connection locations of said disc set to the drive coupling flange.

6. A coupling structure as described in claim 5 in which the torsionally deflecting sandwich structure includes a pair of metal plates with a rubber core bonded therebetween and to the plates, and wherein one of said metal plates is fixedly connected to the adapter flange and the other metal plate has connecting locations as aforesaid with the disc set which are staggered with respect to the disc set connections to the drive coupling flange.

7. The coupling assemblage as defined in claim 5 in which the rubber sandwich is provided with a central opening therethrough and receiving therein the hub of the adapter in radially spaced relation therewith.

References Cited in the file of this patent

UNITED STATES PATENTS 2,499,093     Fast _____ Feb. 28, 1950

UNITED STATES PATENT OFFICE
CERTIFICATE OF CORRECTION

Patent No. 2,846,857            August 12, 1958

Ernest Hagenlocher

It is hereby certified that error appears in the printed specification of the above numbered patent requiring correction and that the said Letters Patent should read as corrected below.

Column 3, line 7, beginning with "5. In a torsionally resilient flexible coupling" strike out all to and including "spaced relation therewith." in column 4, line 15, comprising claims 5, 6 and 7; in the heading to the printed specification, line 12, for "7 Claims." read -- 4 Claims. --.

Signed and sealed this 28th day of October 1958.

(SEAL)
Attest:

KARL H. AXLINE
Attesting Officer

ROBERT C. WATSON
Commissioner of Patents